United States Patent
Deboer et al.

(10) Patent No.: US 8,819,196 B2
(45) Date of Patent: Aug. 26, 2014

(54) SELECTION AND CONFIGURATION OF SERVERS

(75) Inventors: Timothy G. Deboer, Toronto (CA); Timothy M. Francis, Newmarket (CA); Sheldon B. Wosnick, Richmond Hill (CA); Siu Chung Yuen, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 1513 days.

(21) Appl. No.: 10/478,457

(22) PCT Filed: May 3, 2002

(86) PCT No.: PCT/EP02/04839
§ 371 (c)(1), (2), (4) Date: Nov. 21, 2003

(87) PCT Pub. No.: WO02/097621
PCT Pub. Date: Dec. 5, 2002

(65) Prior Publication Data
US 2004/0133665 A1    Jul. 8, 2004

(30) Foreign Application Priority Data
May 30, 2001 (CA) .................. 2349086

(51) Int. Cl.
*G06F 15/177* (2006.01)

(52) U.S. Cl.
USPC ....................................... 709/221

(58) Field of Classification Search
USPC .................. 709/221, 220, 239; 713/100
See application file for complete search history.

(56) References Cited

U.S. PATENT DOCUMENTS

| | | | |
|---|---|---|---|
| 5,774,689 A * | 6/1998 | Curtis et al. ............ | 703/21 |
| 5,964,872 A | 10/1999 | Turpin .................. | 713/1 |
| 6,029,196 A * | 2/2000 | Lenz ................... | 709/221 |
| 6,327,622 B1 * | 12/2001 | Jindal et al. ........... | 709/228 |
| 6,442,685 B1 * | 8/2002 | French et al. ........... | 713/100 |
| 6,760,765 B1 * | 7/2004 | Asai et al. ............. | 709/226 |
| 6,785,713 B1 * | 8/2004 | Freeman et al. ......... | 709/208 |
| 6,842,769 B1 * | 1/2005 | Kim et al. ............. | 709/203 |
| 6,931,381 B1 * | 8/2005 | Petit .................. | 705/53 |
| 7,139,792 B1 * | 11/2006 | Mishra et al. ........... | 709/203 |
| 7,184,945 B1 * | 2/2007 | Takahashi et al. ........ | 703/22 |
| 7,222,168 B2 * | 5/2007 | Kitamura et al. ......... | 709/223 |

(Continued)

FOREIGN PATENT DOCUMENTS

| | | | | |
|---|---|---|---|---|
| EP | 0791881 | 8/1997 | ....... | G06F 9/445 |
| WO | 0014633 | 3/2000 | ....... | G06F 9/46 |
| WO | 0054151 | 9/2000 | ....... | G06F 9/46 |

OTHER PUBLICATIONS

"A Migration Tool to support Resource and Load sharing in Heterogeneous Computing Environments", P.D. Le, B. Srinivasan, Computing Communication 20 (1997) 361-365.

*Primary Examiner* — Shaq Taha
(74) *Attorney, Agent, or Firm* — Steven M. Greenberg, Esq.; CRGO Law

(57) ABSTRACT

The invention provides a mechanism for convenient management for configuring and selecting servers for running modules. The invention provides a method for managing a plurality of servers including receiving a request to configure a suitable server being suitable for running a module, locating an identifier of the suitable server from a table comprising identifiers of suitable servers, configuring the suitable server to run the module.

15 Claims, 13 Drawing Sheets

(56) References Cited

U.S. PATENT DOCUMENTS

| | | | |
|---|---|---|---|
| 2001/0023442 A1* | 9/2001 | Masters | 709/227 |
| 2001/0039585 A1* | 11/2001 | Primak et al. | 709/228 |
| 2002/0032777 A1* | 3/2002 | Kawata et al. | 709/226 |
| 2002/0174247 A1* | 11/2002 | Shen | 709/238 |
| 2003/0171877 A1* | 9/2003 | Adedeji et al. | 702/27 |
| 2005/0198247 A1* | 9/2005 | Perry et al. | 709/223 |

* cited by examiner

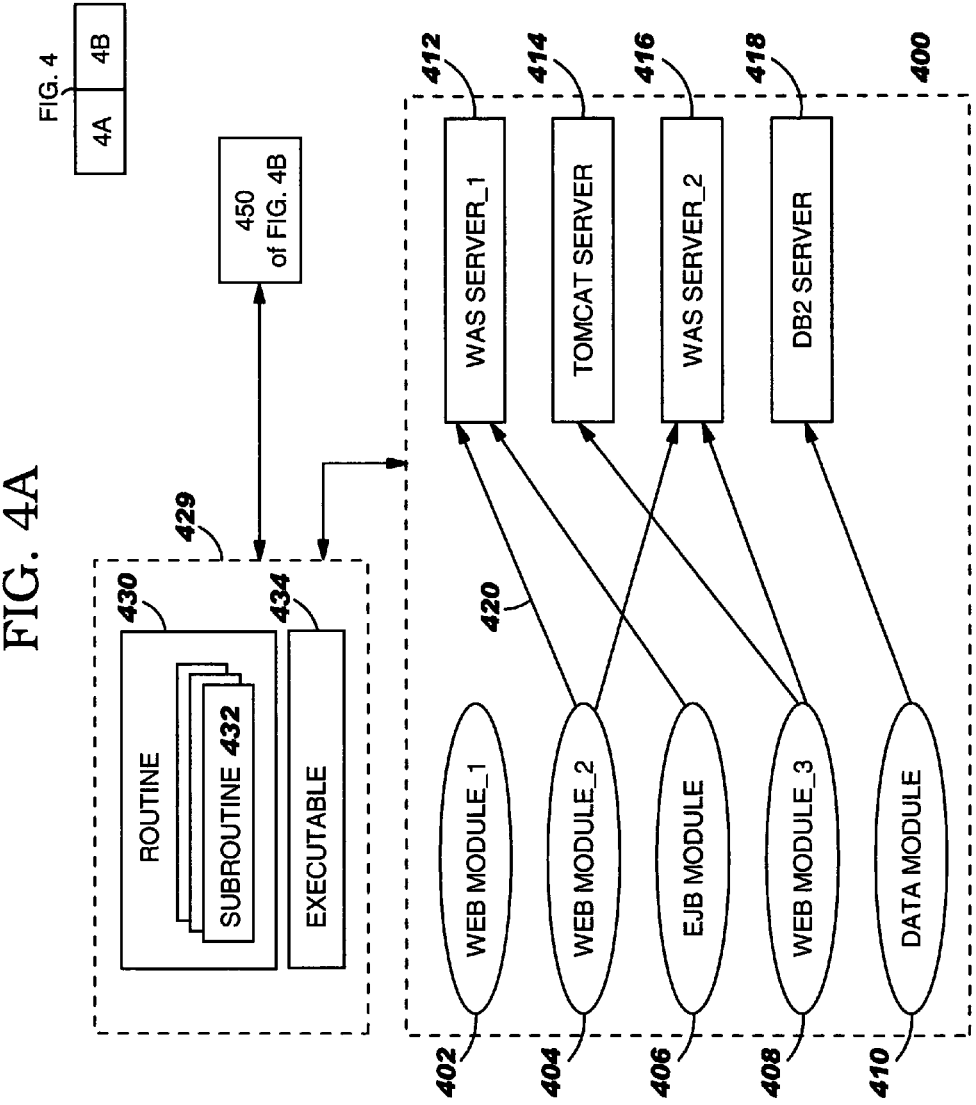

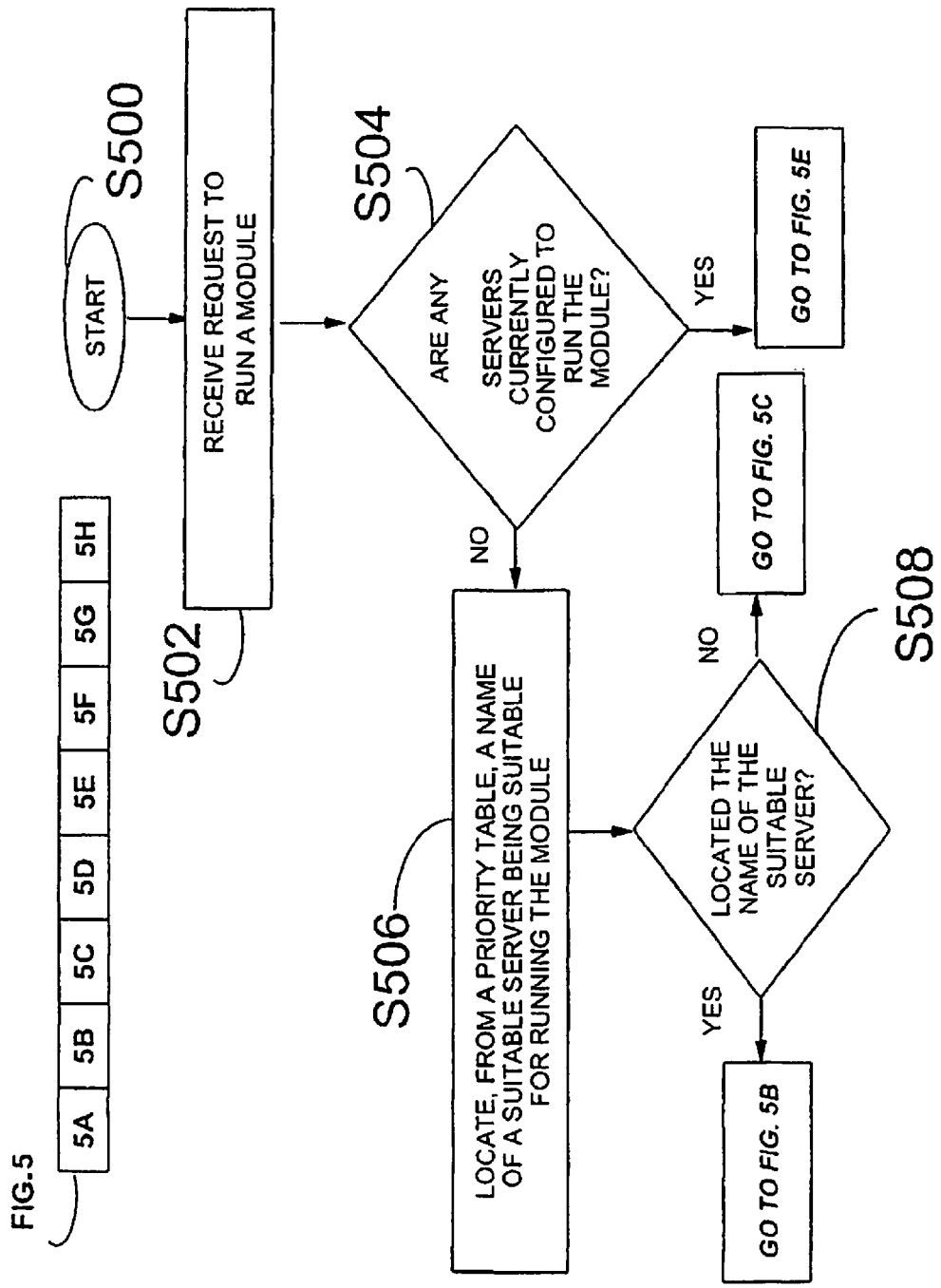

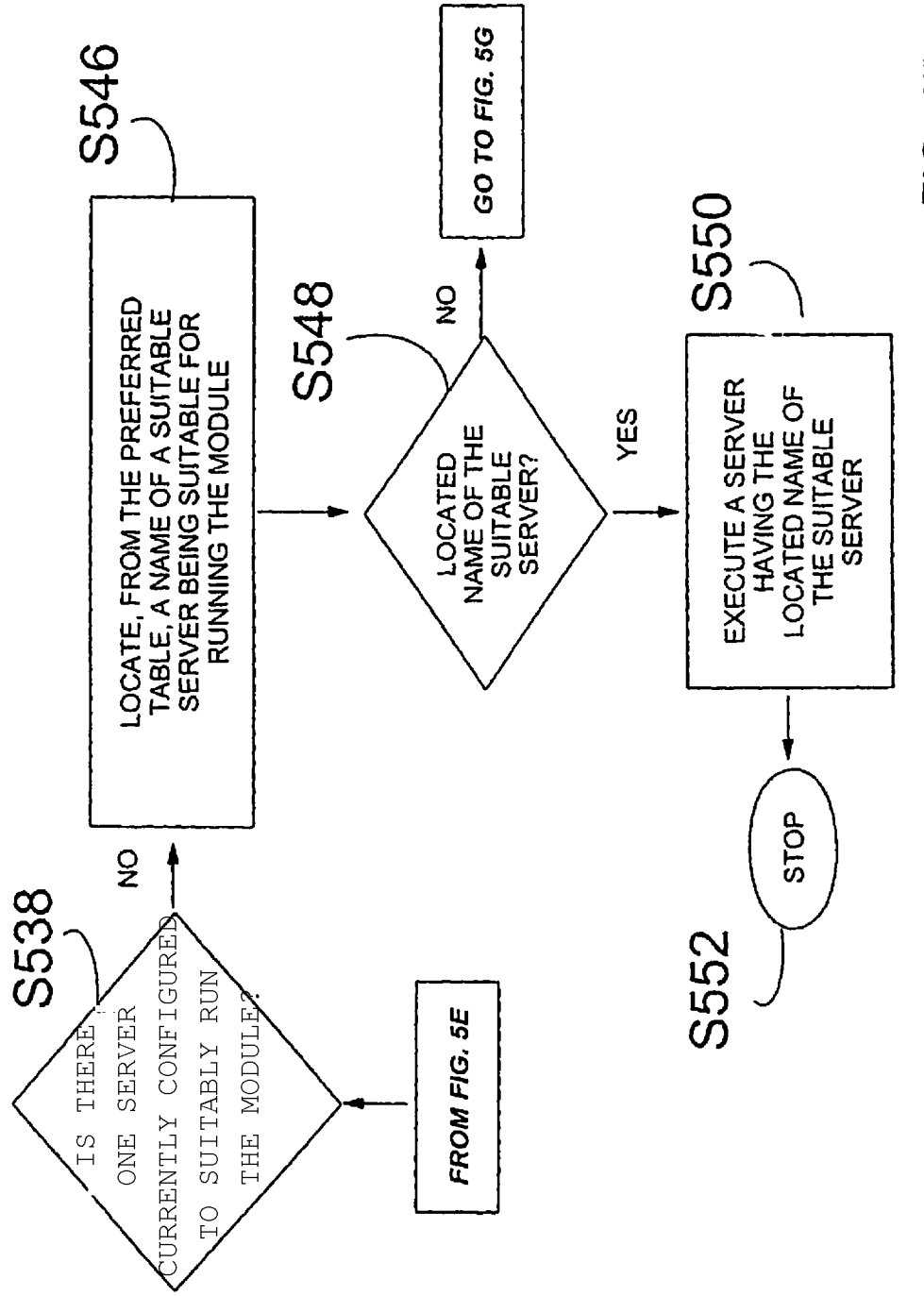

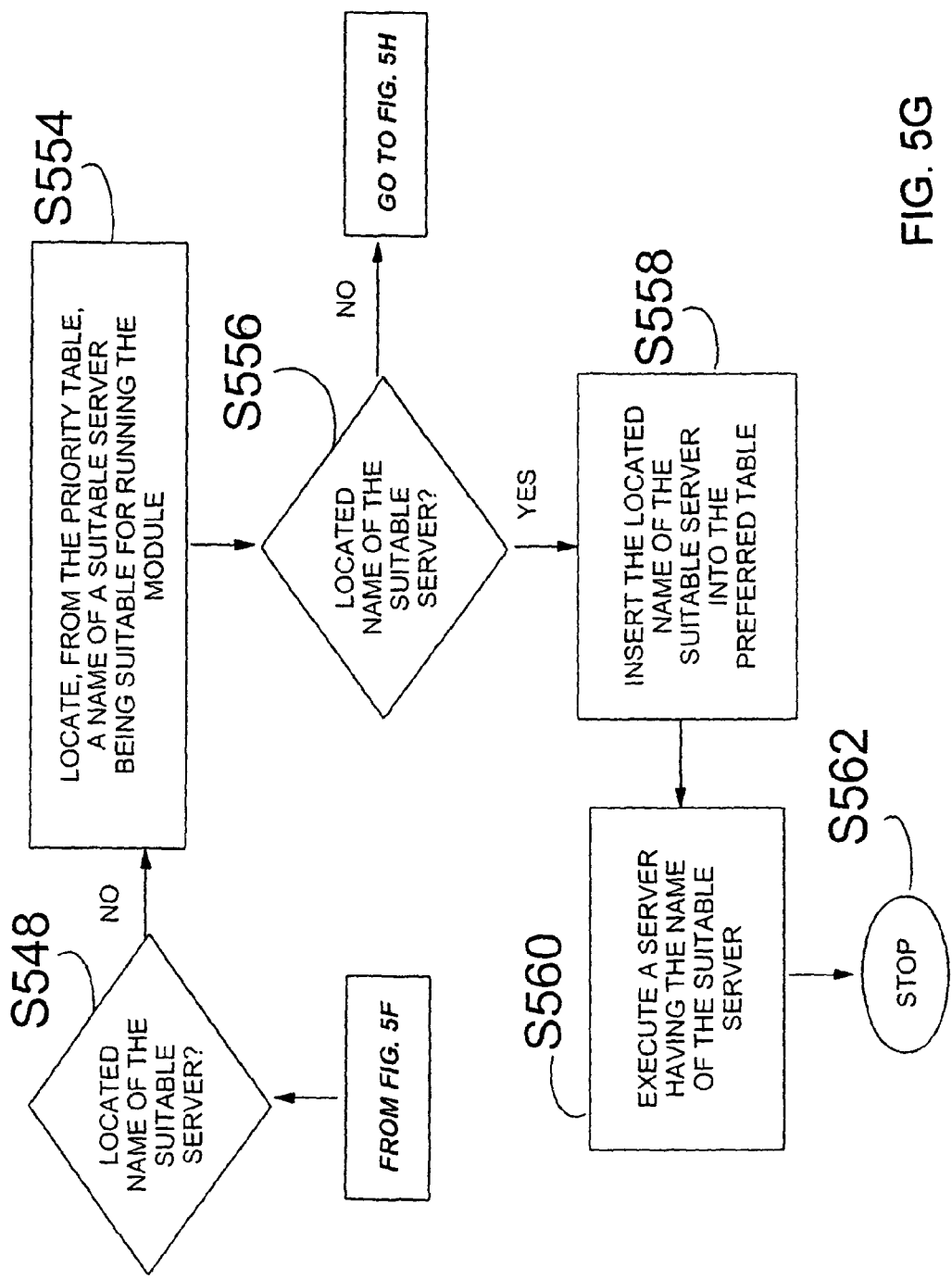

SELECTION AND CONFIGURATION OF SERVERS

FIELD OF THE INVENTION

This invention relates to computer programmed code, and more specifically to a method and a system for configuring and selecting servers to run software modules in a computer software environment.

BACKGROUND OF THE INVENTION

Software development environments for developing software, such as software for Java or HTML, are well known. An example of a software development environment is J2EE™ (Java 2 Platform Enterprise Edition) which is available from Sun Microsystems. J2EE includes a set of services, application programming interfaces (APIs) and protocols for developing multi-tiered, web-based software.

A server is a network-connected computer having server software for managing resources. For example, a file server includes a computer, server and a data storage device for storing files so that users can store files on the file server over a network. A print server includes a computer and server software for managing a network of printers. A network server includes a computer and server software for managing network traffic. A database server is used for processing database queries. Servers are dedicated to perform their predetermined server tasks. For some operating systems, a single computer can execute or run several servers or programs simultaneously. A computer can be used to execute or run several servers of differing types and perhaps simultaneously. A server in this case could refer to the software that performs tasks rather than the combination of the computer and the server. For the sake of simplicity, server software will hereinafter be called "server".

Deployment is a process where servers, in a software development environment, are configured to run software modules hereinafter called "modules". The task of configuring the servers may be performed by the members of the software development team. There are several types of modules, such as EJB (Enterprise Java Beans), WEB (Internet WEB information), and application clients. A module can include computer programmed files having computer programmed code or software, computer executable code, or computer readable data. The computer files can be organized in a directory having sub-directories.

Referring to FIG. 3, block 300 depicts a prior art software development environment that resides in the memory of a computer. It will be appreciated that environment 300 can reside in the memories of various network-connected computers, and environment 300 is not merely limited to residing on a single computer. Blocks 302, 304, 306, and 308 depict various modules. Modules 302 and 308 represent a WEB type module. Module 304 represents an EJB type module. Module 306 represents a data type module. Blocks 310 and 314 Represent® various types of servers of environment 300. Servers 310 and 314 each have a configuration file 312 and 316, respectively. Server 310 represents a WebSphere® Application Server available from IBM Corporation. Server 312 represents a DB2® (database) Server also available from IBM Corporation. Arrows 318, 320, and 322 indicate that a server has been deployed or configured to run a particular module or modules. Arrows 318 and 320 indicate that server 310 has been configured or deployed to execute or run modules 302 and 304, respectively. Arrow 322 indicates that server 314 has been deployed or configured to run module 306. A server of development environment 300 has yet to be configured to execute module 308. It can also be said that module 308 has yet to be deployed to run on a server. Configuration files 312 and 316 are used to indicate which modules can be run by servers 310 and 314 respectively. If a software developer sends a request to a server that is configured to execute a module, then the configured server will execute the module. However, if a server has not yet been configured to execute the module, then the module is not executed by the server. To have an appropriate server run module 308, a software developer must first change the configuration file of the appropriate server. Therefore, every time a new module is to be run by a server, the configuration file of a suitable server must be modified. During the software development cycle, many modules are created and require testing. It is inconvenient to modify configuration files of various appropriate servers every time a new module is created and needs to be tested, especially when numerous software developers are involved in developing various modules.

The prior art provides an inadequate mechanism for configuring and selecting servers in a software development environment. Software developers are required to spend valuable time performing the task of configuring appropriate servers to execute or run newly developed modules before the modules can be executed or run by the appropriate servers, which can lead to confusion when numerous developers are involved. The prior art mechanism becomes problematic and inconvenient when the development environment includes a multitude of types of servers, and the software developers are working to meet a deadline for developing and delivering fully tested modules.

SUMMARY OF THE INVENTION

An object of the invention is to provide a mechanism for configuring and selecting suitable servers being suitable for running various modules.

The invention provides a method for configuration and selection of suitable servers being suitable for running various modules. The method can be tangibly embodied in an executable program which can configure and select various servers of a software environment. Suitable servers can be identified from a lookup table. Various types of lookup tables can be implemented and used in a suitable combination with each other, such as a backup table, a preferred table, and a priority table.

The backup table includes identifiers for identifying types of suitable servers that correspond to types of modules. If a suitable server cannot be readily located from the software environment, then a type of a suitable server can be located or identified from the backup table and a suitable server can subsequently be created to run the module. The backup table can contain predetermined identification of various types of servers and corresponding types of modules that the servers can execute, or can contain no identifiable servers in which the user must insert the required identification in the default table.

The preferred table includes identifiers for identifying names of suitable servers that correspond to names of modules. The server selection logic can be set up so that to locate or identify a suitable server, the preferred table is examined before examining the backup table. If the preferred table does not provide an identifier of a suitable server, then the backup table is used. The preferred table can contain predetermined identification of various identifiers or names of servers and corresponding identifiers or names of modules that the servers can execute. Alternatively, the preferred table can contain no identifiers of servers and identifiers of corresponding modules in which the user must insert the required identifiers in the default table.

The priority table can be used as a list which includes identifiers of previously created suitable servers in which the software developers can rank or prioritize the order of the suitable servers. If all three types of tables are used, the server selection logic can be set up so that to locate or identify a suitable server, the priority table is examined before examining the preferred table or the backup table. If the priority table does not contain the identifier of a suitable server, then the preferred table is examined before examining the backup table. If the preferred table does not contain the identifier of a suitable server, then the backup table is examined to locate the identifier of a suitable server. The priority table can contain predetermined identifiers or names of various servers, or can contain no identified servers in which the user must insert the required identification in the priority table.

According to a first aspect of the present invention, there is provided a method for managing a plurality of servers including receiving a request to configure a suitable server being suitable for running a module, locating an identifier of the suitable server from a table including identifiers of suitable servers, and configuring the suitable server to run the module.

According to a second aspect of the present invention, there is provided a computer program product for use in a computer system operatively coupled to a computer readable memory, the computer program product including a computer-readable data storage medium tangibly embodying computer readable program code for directing the computer to for manage a plurality of servers, the code including code for instructing the computer system to receive a request to configure a suitable server being suitable for running a module, code for instructing the computer system to locate an identifier of the suitable server from a table including identifiers of suitable servers, and code for instructing the computer system to configure the suitable server to run the module.

According to a third aspect of the present invention, there is provided a computer system operatively coupled to a computer readable memory, the computer system for managing a plurality of servers, the computer system including means for receiving a request to configure a suitable server being suitable for running a module, means for locating an identifier of the suitable server from a table including identifiers of suitable servers, and means for configuring the suitable server to run the module.

According to a fourth aspect of the invention, there is provided a set of data for configuring and selecting a server to run a module, the set of data including a table for containing an identifier of a suitable server being suitable for running the module.

A better understanding of these and other aspects of the invention can be obtained with reference to the following drawings and description of the preferred embodiments of the invention.

DRAWINGS OF THE INVENTION

The following figures are embodiments of the invention, in which.

DETAILED DESCRIPTION OF THE PREFERRED EMBODIMENTS OF THE INVENTION

Figure 1:
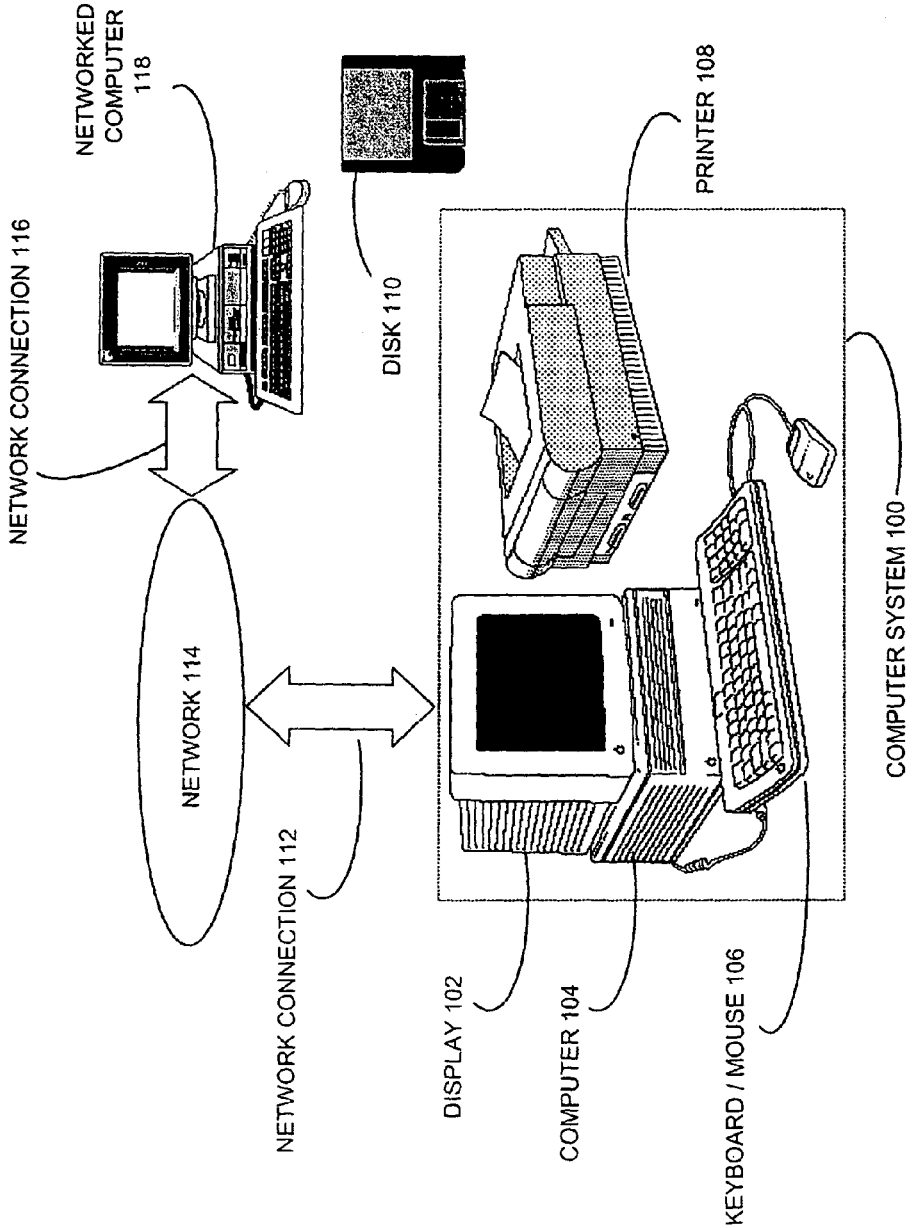
FIG. 1 depicts a computer system.

Referring to FIG. 1, there is depicted conventional computer network suitable for the preferred embodiments of the present invention. A conventional computer system 100 operationally coupled to a networked computer 118 via suitable network connections 112, 116 and network 114. Network 114 is a conventional network such as a local area network, wide area network, intranets, Internet, and the like, or a convenient combination thereof. The network 114 provides a convenient mechanism for transporting data to and from the computer system 100. It will be appreciated that another embodiment of the invention can include a computer system 100 not being connected to the network 114 via network connection 112, provided the data is entered directly to the memory of computer system 100 via a keyboard/mouse 106 or via a removable computer readable media, such as a floppy disk 110.

For convenience, aspects of the preferred embodiments of the present invention can be distributed amongst various networked computers interacting with a computer system 100 via network 114 or a combination of networks. However, for convenient illustration of the preferred embodiments of the invention, the flowchart of FIG. 5 will be generally implemented in computer system 100.

Computer system 100 includes a computer 104 which communicates with various output devices such as a display terminal 102 or a printer 108, with the network 114, and with various input devices, such as keyboard/mouse 106, or a disk 110. Other devices can include various computer peripheral devices, such as a scanner, CD-ROM drives, and the like.

Figure 2:
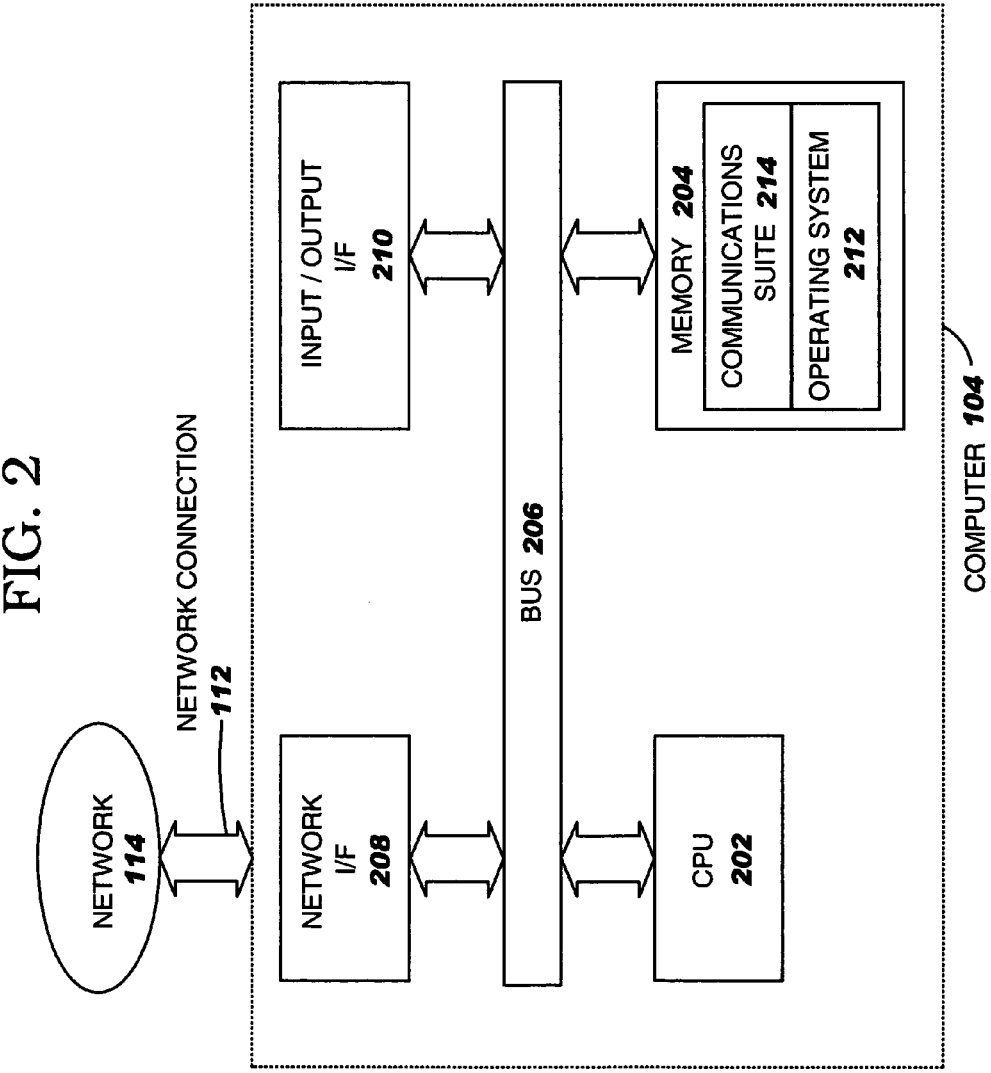
FIG. 2 depicts a structure of the computer of FIG. 1.
Figure 3:
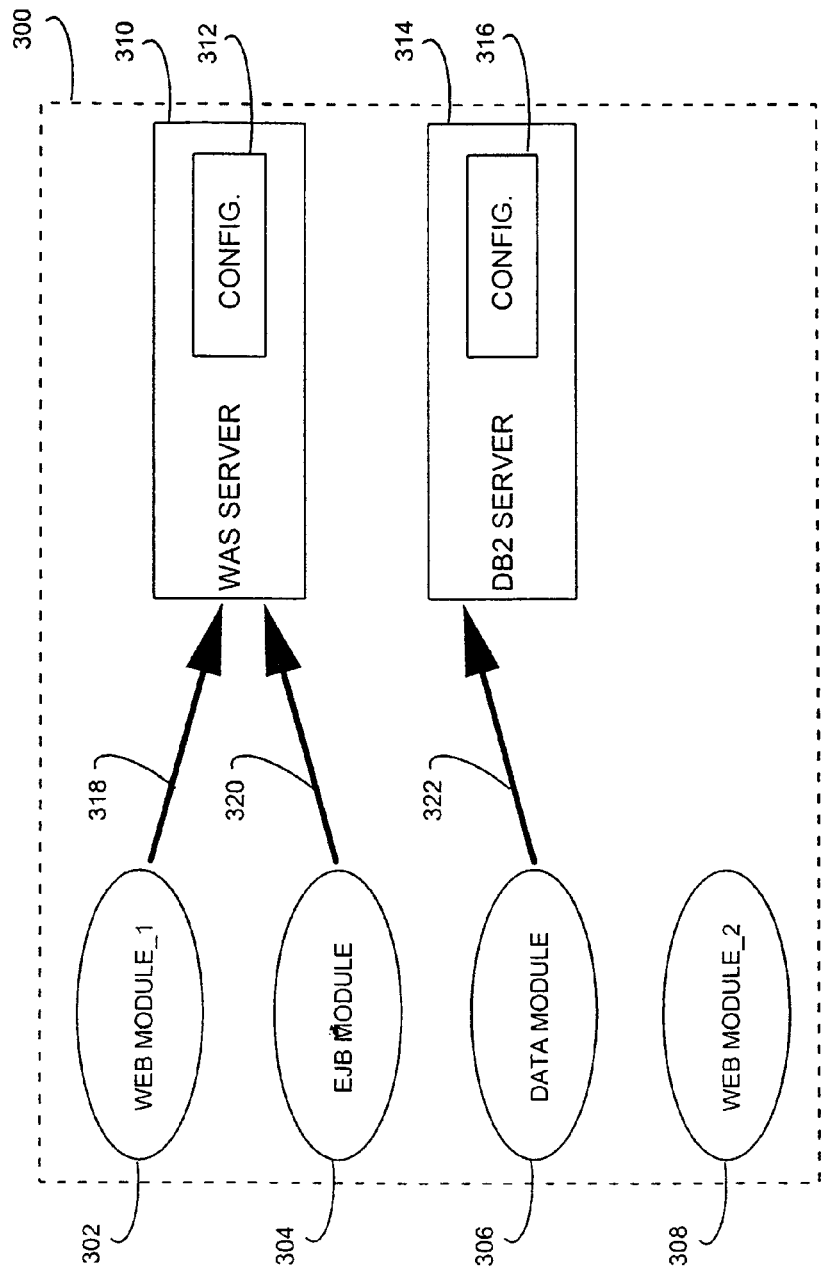
FIG. 3 depicts a prior art software development environment.

Referring to FIG. 2, there is depicted a structure of computer 104 suitable for the preferred embodiments of the present invention. Computer 104 includes a bus 206 that operationally interconnects various sub systems or components of the computer 104, such as a central processing unit (CPU) 202, a memory 204, a network interface (I/F) 208, and an input/output interface 210.

CPU 202 is a commercially available central processing unit suitable for operations described herein. Other variations of CPU 202 can include a plurality of CPUs. Suitable support circuits or components can be included for adapting the CPU 202 for optimum performance with the subsystems of computer 104.

Input/output (I/O) interface 210 enables communication between various subsystems of computer 104 and various input/output devices, such as keyboard/mouse 106. Input/output interface includes a video card for operational interfacing with display unit 102, and preferably a disk drive unit for reading suitable removable computer-readable media, such as a floppy disk 110, or CD. Removable media 110 provides programming instructions for subsequent execution by CPU 202 to configure and enable system 100 to achieve the functionality depicted in the flow chart of FIG. 5, or can provide removable data storage if desired.

Network interface 208, in combination with a communications Suite 214, enables suitable communication between computer 104 and other computers operationally connected via network 114. Examples of a conventional network interface can include an Ethernet card, a token ring card, a modem, or the like. Optionally, network interface 208 may also enable retrieval of transmitted programming instructions or data to configure and enable computer 104 to achieve the preferred embodiments of the invention. Optionally, aspects of the preferred embodiments of the invention can be enabled in various computer systems operationally networked to form a distributed computing environment.

Memory 204 includes volatile and persistent memory for storage of programming instructions for instructing the CPU 202, data structures such as data repositories, operating system 212, and communications suite 214. Preferably, memory 204 includes a combination of random access memory (RAM), read-only memory (ROM), and a hard disk storage device. It will be appreciated that programming instructions can be delivered to memory 204 from an input/output device, such as a floppy disk 110 of FIG. 1 inserted in a floppy disk drive via input/output interface 210, or downloaded to memory 204 from network 114 via network interface 208.

Operating system 212 suitably co-operates with CPU 202 to enable various operational interfaces with various subsystems of computer 104, and for providing various operational functions, such as multitasking chores and the like. Communications suite 214 provides, through interaction with operating system 212 and network interface 208, suitable communications protocols to enable appropriate communications with networked computing devices via network 114, such as TCP/IP, ethernet, token ring, and the like.

Figure 4B:
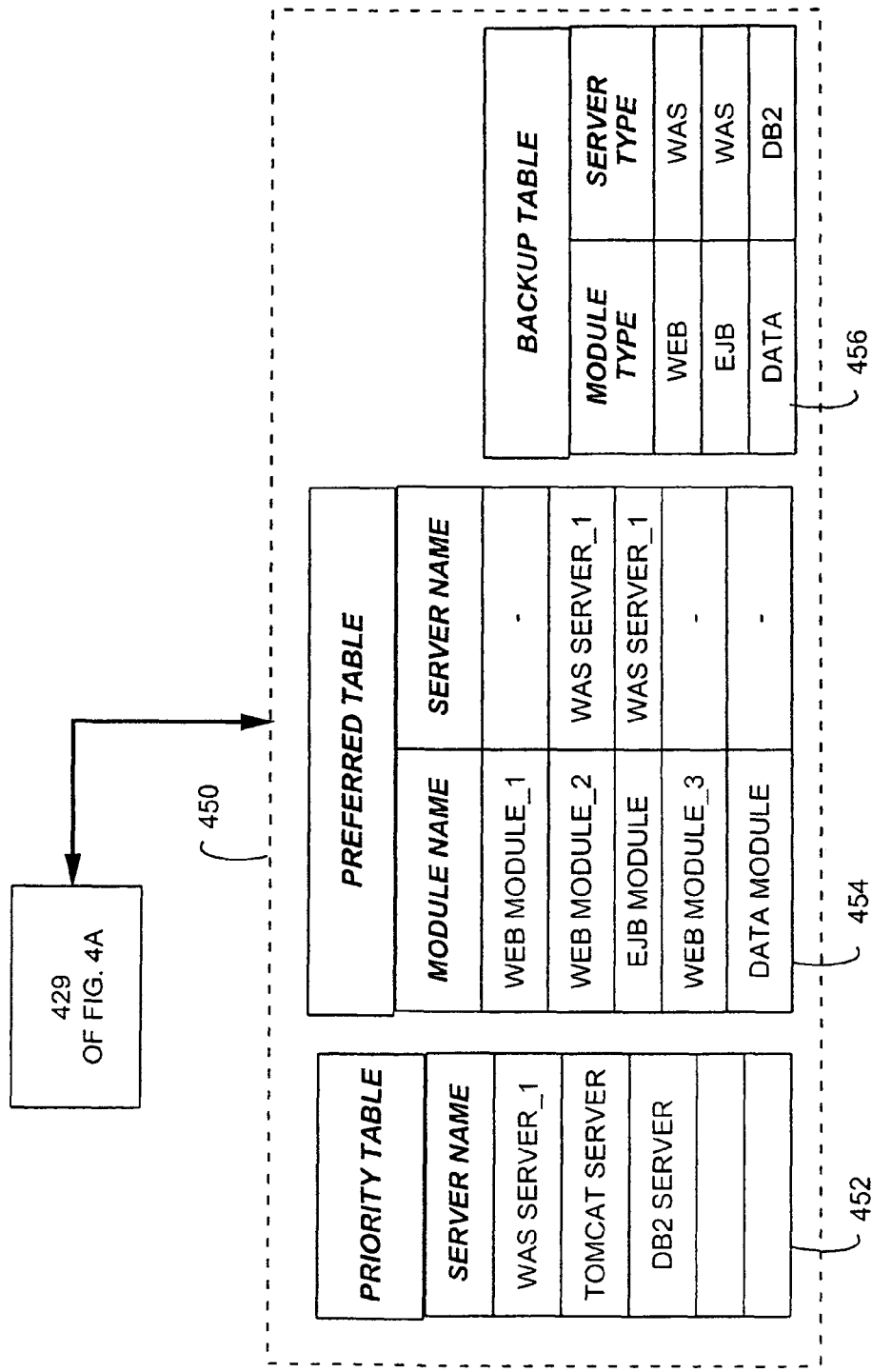
FIG. 4 depicts a deployer software routine and deployment data for setting up servers to deploy modules in a software development environment.

Referring to FIG. 4, there is depicted a software development environment for a preferred embodiment of the present invention. FIG. 4 includes FIGS. 4A and 4B. A software development environment 400 is depicted in FIG. 4A. A module 402 has a name 'WEB MODULE_1'. It will be appreciated that this invention can be used for types of modules yet to be developed, and that for the sake of simplifying the explanation of the operation of the invention, the name of a module will be used to identify the module. The invention is not limited to using names to identify modules, and any suitable identifier can be used for identifying a module. Thus a module 404 has the name 'WEB MODULE_2'; A module 406 has the name 'EJB MODULE'; A module 408 has the name 'WEB MODULE_3'; and A module 410 has the name 'DATA MODULE' and includes computer data.

A server 412 has the name 'WAS SERVER_1'. It will be appreciated that for the sake of simplifying the explanation of the operation of the invention the name of a server will be used to identify the server. The invention is not limited to using names to identify servers, and any suitable identifier can be used for identifying a server. Thus, a server 414 has the name 'TOMCAT SERVER'; A server 416 has the name 'WAS SERVER_2'; and a server 418 has the name 'DB2 SERVER'.

Arrows 420 represent the servers that are currently configured to run modules. Server 412 is currently configured to run modules 404 and 406. Server 414 is currently configured to run module 408. Server 416 is currently configured to run modules 404 and 408. Server 418 is currently configured to run module 410. A server has yet to be selected or configured for running module 402. Therefore, when a software developer requests to run module 404, either server 412 or 416 can run the module 404. However, when the software developer requests to run module 402, none of the servers will respond to the request, unless a table of block 450 is used to select and configure a suitable server for running the module, which will be described in the flowchart depicted in FIG. 5.

Block 429 represents computer instructions expressed in various forms. A software routine 430, hereinafter called a "routine", includes computer programmed instructions for carrying out the steps of the flowchart depicted in FIG. 5. The instructions of routine 430 are written in a suitable computer programming language such as Java. The instructions of routine 430 are subsequently interpreted, compiled, or converted to generate instructions for execution by central processor 202, the instructions hereinafter called "executable code" 434. Code 434 is subsequently placed in memory 204 of computer 104, depicted in FIGS. 1 and 2. Executable code 434 will be used for directing the CPU 202 to carry out the steps depicted in the flowchart of FIG. 5. A set of subroutines 432 carry out the steps depicted in the flowchart of FIG. 5.

Block 450 depicts a group of tables which will be used by the instructions of routine 430 to select and configure suitable servers. For the sake of providing a simplified explanation for the operation of the invention. Separate tables are indicated by reference numerals 452, 454, and 456, each being identifiable by name. The name of a table having data will be used to identify the table. The invention is not limited to using names to identify tables, and any suitable identifier can be used for identifying a table. A table can be a look-up table, a file, a list, a map, or a suitable database.

A priority table 452 has names or identifiers of servers of the software environment 400. Table 452 is not a list of all identified servers of environment 400. Table 452 includes a listing of identified servers that are identified by the user as being priority servers. Routine 430 will examine table 452 to select a suitable server, as will be explained in FIG. 5. The data contained in table 452 can be read, edited or modified, and subsequently updated or stored by a user via the keyboard or mouse 106 of FIG. 1, which can be accomplished via a suitable subroutine 432 of routine 430, or which can be accomplished via routine 430 following the steps depicted in FIG. 5. The table 452 includes names of suitable servers that are placed in a sequence or order in a preferred hierarchy, in which a topmost positioned, user-identified server will be initially selected to deploy a module. However, if the topmost positioned user-identified server is not suitable (i.e., the server is not currently configured to run the module), then the next (i.e., lower) identified server in table 452 is checked for suitability. A user determines a preferred hierarchical order of the selection of suitable servers that are listed or identified in table 452. When a user requests to run a module, table 452 is initially examined to locate or identify a suitable server that can run the module. If table 452 cannot provide a suitable server, then table 454 or table 456 can be examined to locate a suitable server. Persons having ordinary skill in the art of computer programming can set up table 452 so that an identifier of a server is associated with a rank, and that other suitable forms of ranking are possible for use in table 452.

Table 454 represents a preferred table having pairs of data in which each pair of data includes a name or identifier of a module, and includes a name of a preferred suitable server that corresponds to the name of the module. Table 454 is used to identify the modules which can be run in environment 400 and for identifying the preferred suitable server. When a user requests to run a module and the module cannot be identified from table 454, then table 456 can be examined for configuring a suitable server to run the module. For example, when it is required to run WEB MODULE_2, WAS SERVER_1 will be used to run WEB MODULE_2. It will be appreciated that table 454 can be substituted by inserting portions of table 454 in the modules. For sake of convenient explanation of the operation of the invention, table 454 will be used, and it will be understood that the scope of the invention can cover embodiments of the invention in which portions of table 454 can be embedded in various modules. For example, a module can have a deployment descriptor which would provide a convenient mechanism for identifying a preferred server for the module.

Table 456 represents a backup table including pairs of data in which each pair of data includes an identifier of a type of module and an identifier of a type of server that corresponds to the identifier of the type of module. The purpose of table 456 is to provide a list of types of servers that are known to be capable of supporting types of modules. Table 456 contains data provided by the manufacturer of code 434, such as a database in which data cannot be written to table 456. It will be appreciated that table 456 can be adapted so that code 434 can write data to table 456. If table 452 is empty or a suitable server is not identified in table 454, then code 434 refers to table 456 to obtain an identifier for a suitable server capable of running a module. When a module is required to run and the identifier of the type of module cannot be located from table 456, then the user can be given an opportunity to select or choose a suitable server for running the module.

Referring to FIG. 5, there is depicted a flowchart illustrating a process for selecting and configuring servers to run modules in a software environment 400 depicted in FIG. 4. FIG. 5 includes FIGS. 5A to 5H inclusive. The flow chart of FIG. 5 is a preferred embodiment of the invention. The flowchart is used for selecting and/or configuring a suitable server to run a module. Routine 430 of FIG. 4 will include computer programmed code or instructions for encoding the flowchart of FIG. 5. The programmed code will be used for directing CPU 202 of computer 104 of FIGS. 1 and 2 to achieve the operations illustrated in the flowchart in FIG. 5.

Referring to FIG. 5A, from S500 the process of the preferred embodiment begins. The operations depicted in FIG. 5 will be performed by the software routine 430 of FIG. 4, unless otherwise indicated in the description.

S502 receives a request to run a module. The request can be provided by a user via the keyboard/mouse 106 or from the networked computer 118 via network 114 of FIG. 1. If the user is not yet ready to immediately run or execute the module, then the requests received can be a request to configure a suitable server with an option to run the module at a subsequent time. S502 can be adapted so that the routine can wait to receive the request to run a module or configure a suitable server to run a module, or both.

S504 determines whether there are any servers in the software environment 400 of FIG. 4 that are currently configured to run the module. If there are no servers currently configured to run the module, then processing continues to S506. If there are any servers configured to run the module, processing continues to S538 of FIG. 5E. By proceeding to S506, the decision has been made that there is no servers defined or configured to run the module. Consequently, either a new suitable server must be created or an existing suitable server, which has not yet been configured to run the module, must be configured. By proceeding to S538, the decision has been made that there are multiple servers (or at least one server) that can run the module.

S506 locates a name of a suitable server being suitable for running the module. The name of the suitable server can be located from priority table 452 of FIG. 4. To simplify the operation of the preferred embodiment of the invention, the prior table 452 can be removed from block 450, and S504, S506, S508, S510, S512, S514, and S516 can be removed from the flowchart of FIG. 5, and processing can flow from S502 to S518 and then subsequently proceed to S520 and through to S532. However, by including S502 to S516, the invention provides an additional mode of operation.

For example, assume the user needs to run module 404 WEB MODULE_2. In S506, table 452 will be examined in which WAS SERVER_1 is located. Since WAS SERVER_1 is a suitable server that has been previously configured to run WEB MODULE_2 then WAS SERVER_1 runs WEB MODULE_2, and processing continues to S510 of FIG. 5B. It is assumed that if the user needs to run module WEB MODULE_3, then table 452 is examined. In latter scenarios, the entries of table 452 will be cycled in a prioritized manner in which it will be found out that no suitable server can be identified or located from table 452 for which then processing continues to S518 of FIG. 5C.

S508, when performed, determines whether the located name (i.e., the identifier) of the suitable server was located from table 452. If the name was located, then processing continues to S510 in FIG. 5B. If the name was not located, then processing continues to S518 in FIG. 5C.

Figure 5B:
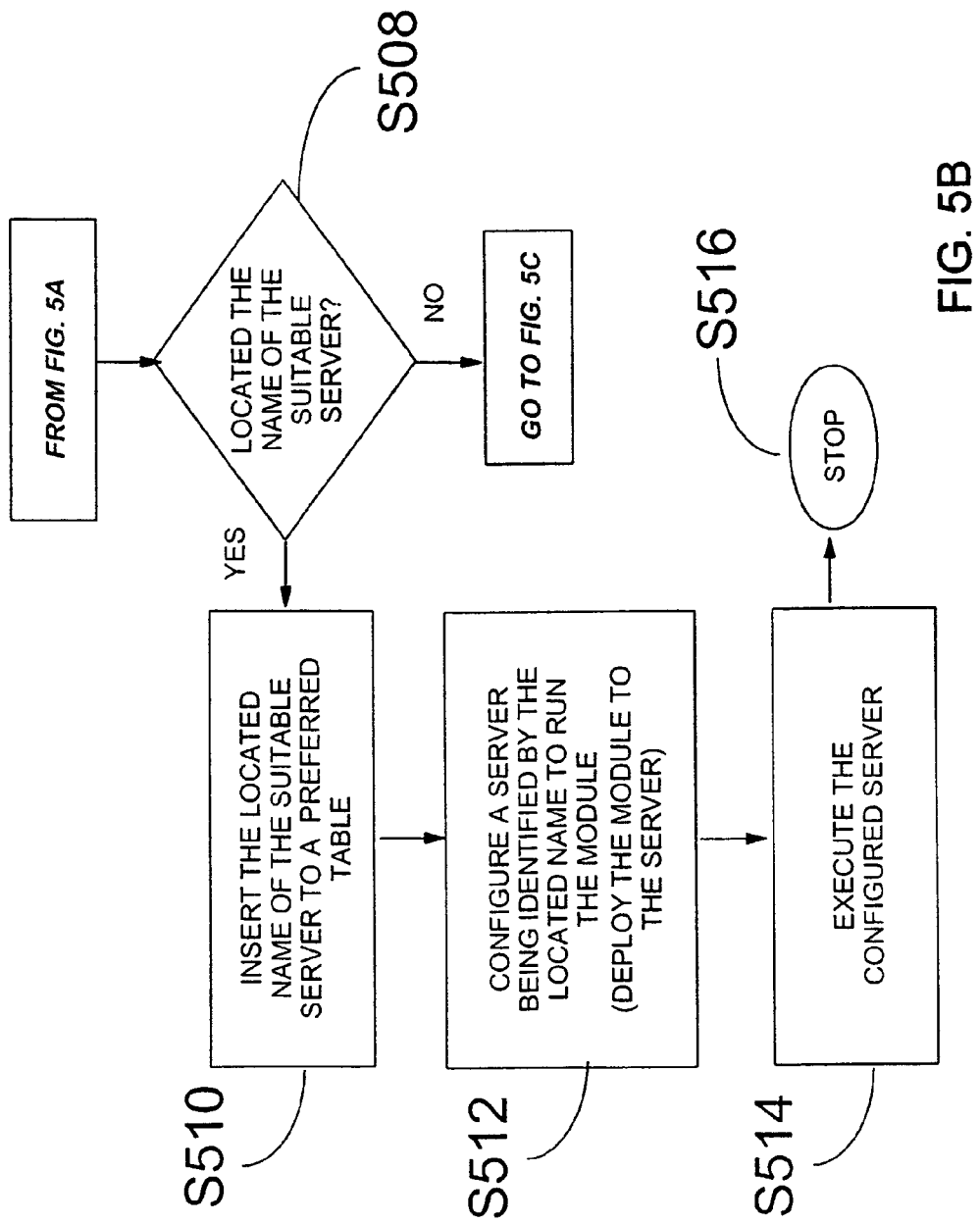
FIG. 5 depicts a flowchart for setting up servers to deploy modules.

Programming flow continues to S510 of FIG. 5B when a suitable server was not located or identified from table 452. S510 inserts the located name of the suitable server into the preferred table 454 of FIG. 4. S510 is performed to that next time that the same module is required to run, then table 454 will be in a position to provide identification of the suitable server for the module. S510 can include adapting a configuration file of the suitable server to run the module so that when the suitable server is requested to run the module, the suitable server can check its configuration and run the module. After modifying table 454, S512 configures the server having the name of the located name of the suitable server. S514 sends a command to the suitable server to subsequently run or execute the module. S516 stops the routine 430. Processing could also continue to S502 in which the routine 430 can remain in a wait state until it receives another request to run another module or configure another server.

Figure 5C:
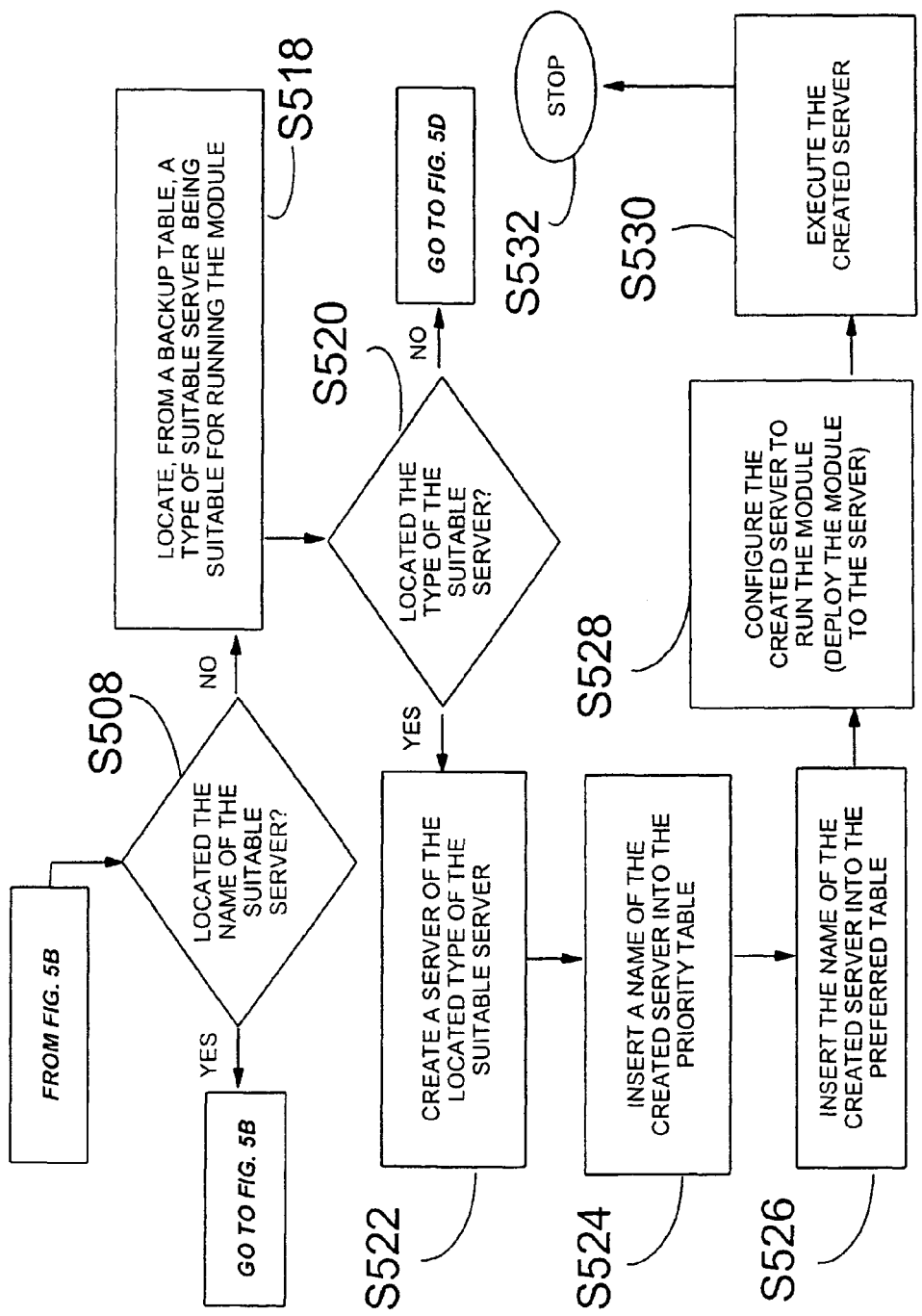

Programming flow continues to S518 of FIG. 5C when table 452 does not provide identification of a suitable server from S508 of FIG. 5B. Performance of S518 locates a type of a server being suitable for running the module. The type of the suitable server can be located from a backup table 456 of FIG. 4 because the suitable server was not located from priority table 452. S520 determines whether the located type of the suitable server was located from table 456. If the type of the suitable server was located from table 454, then processing continues to S522. If the type of the suitable server was not located from table 454, then processing continues to S534 of FIG. 5D. S522 creates a server of the located type of the suitable server that was identified or located from table 456. The created suitable server becomes another server of the software environment 400 of FIG. 4. S524 inserts a name of the created server into the priority table 452 of FIG. 4, so that the next time the same module is required to run, the name of the suitable server can be identified from table 452. S526 inserts the name of the created suitable server into the preferred table 454 of FIG. 4, so that the next time the same module is required to run, the name of a suitable server can be identified from table 454. S526 provides a way to update the table 454 just in case table 452 happened to have been changed by a user at some future time. S528 configures the created suitable server to run the module. S530 executes the created suitable server, in which the executed created suitable server runs or executes the module. S532 stops the routine 430. Processing could also continue to S502 in which case the routine 430 can remain in a wait state until it receives another request to run another module or configure another server.

Figure 5D:
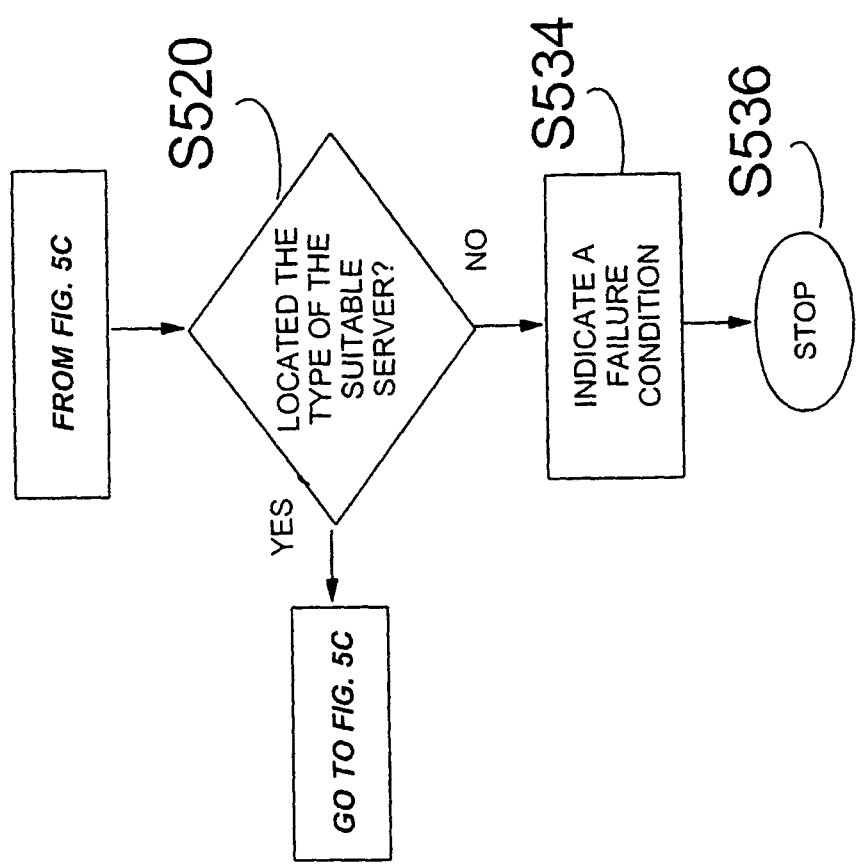

Programming flow continues to S534 of FIG. 5D when S520 of FIG. 5C does not locate a suitable server from table 456. S534 indicates a failure condition because the type of the suitable server was not located from table 456. S536 stops the routine 430. Processing could also continue to S502 in which case the routine 430 can remain in a wait state until it receives another request to run or deploy another module. S534 can also be adapted to allow a user to choose a suitable server since table 456 could not provide identification of the suitable server.

Figure 5E:
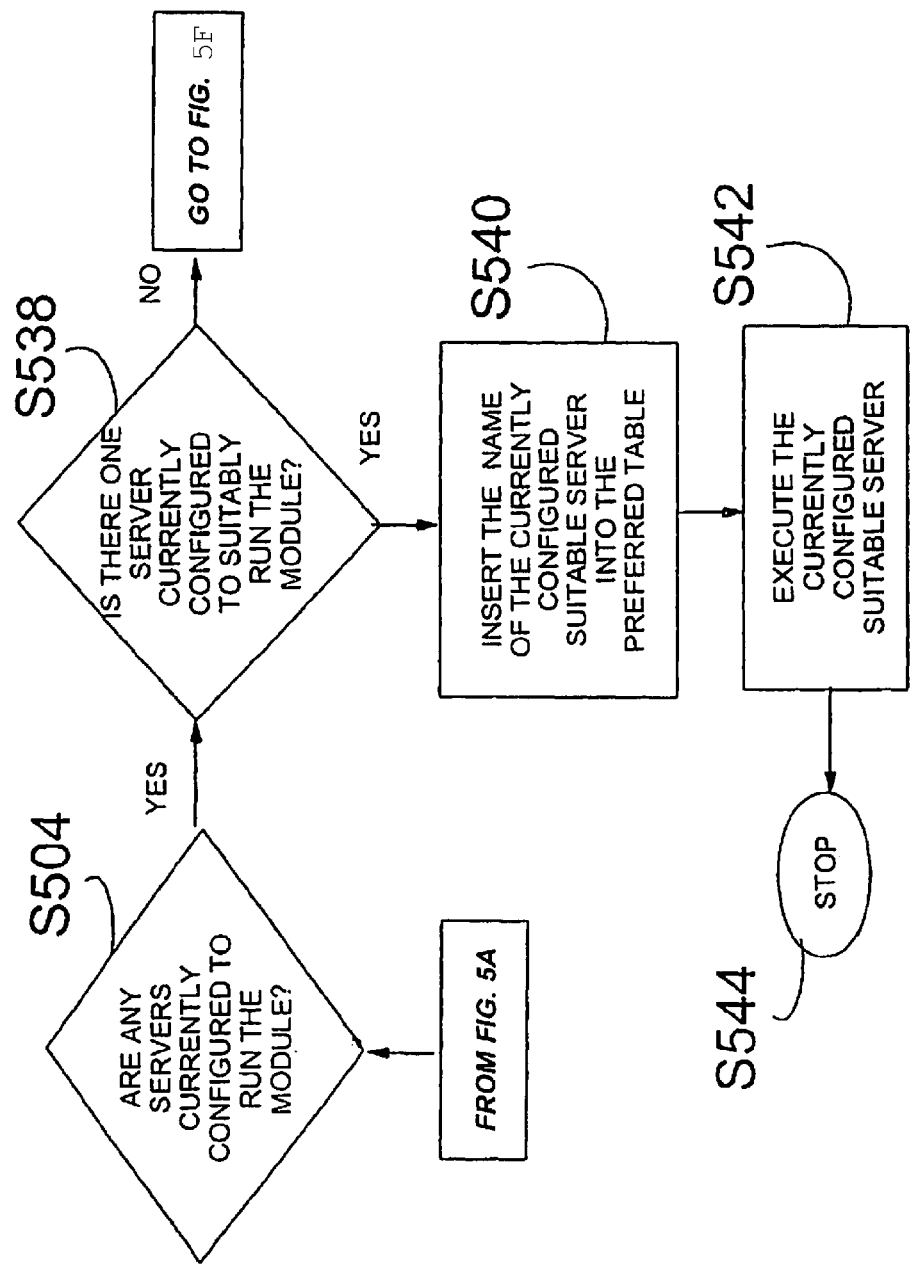

Programming flow continues to S538 of FIG. 5E if S504 of FIG. 5A determines that there is a server currently configured to run the software module. S538 determines whether there is one suitable server currently configured to run the module. If there is one suitable server that is currently configured to run the module, then processing continues to S540. S538 and higher are used to add additional features to the operation of software routine 430. S540 inserts a name of the currently configured suitable server to into the preferred table 454 so that next time the same module is required to run, the name of the suitable server can be identified from table 454. S542 executes the currently configured suitable server to run or execute the module. S544 stops the routine 430. Processing could also continue to S502 in which case the routine 430 can remain in a wait state until it receives another request to run or deploy another module.

Programming flow continues to S546 of FIG. 5F when table 454 does not identify a suitable server in which table 452 will be subsequently examined in S546. S546 locates a name of a suitable server being suitable for running the module from table 454. S548 determines whether the name of the suitable server was located from table 454. If the name of the suitable server was located from table 454, then processing continues to S550. If the name was not located from table 454, then processing continues to S554. S550 executes a server having the located name of the suitable server, in which the executing server runs the module. S552 stops the routine 430. Processing could also continue to S502 in which case the routine 430 can remain in a wait state until it receives another request to run or deploy another module.

Programming flow continues to S554 of FIG. 5G when table 454 does not identify a suitable server in which table 452 will be examined in S554. S554 locates a name of a suitable server being suitable for running the module. The name of the suitable server can be located from the priority table 452 of FIG. 4. S556 determines whether the name of the suitable server was located from table 452. If the name was located, then processing continues to S558. If the name was not located, then processing continues to S564. S558 inserts the located name of the suitable server into the preferred table 454 of FIG. 4, so that next time the same module is required to run, the suitable server can be located from table 454. S560 executes a server having the located name of the suitable server, in which the server runs the module. S562 stops the routine 430. Processing could also continue to S502 in which case the routine 430 can remain in a wait state until it receives another request to run or deploy another module.

Figure 5H:
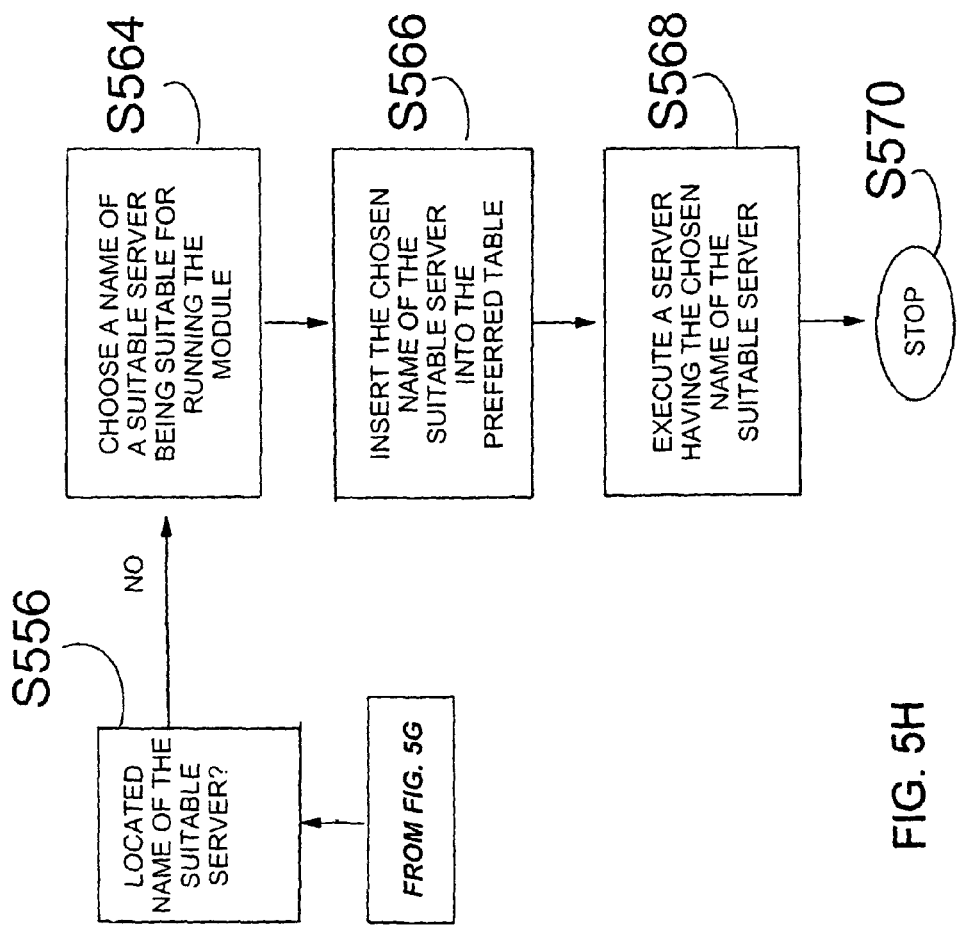

Programming flow continues to S564 of FIG. 5H when table 452 does not identify a suitable server in which processing continues to S564 as a last resort to identify a suitable server. S564 choosing a name of any server being suitable for running the module. S566 inserting the chosen name of any suitable server into the preferred table 454 of FIG. 4. S568 executing a suitable server being identified by the chosen name of any suitable server, in which the suitable server having the chosen name runs or executes the module. S570 stopping the routine 430. Processing could also continue to step S502 in which case the routine 430 can remain in a wait state until it receives another request to run another module or configure another server.

For simplifying the explanation of the operation of the invention, an example of the use a method embodying the invention will involve a software development environment. It will be appreciated that the method provided by the preferred embodiment of the invention can be applied to other software systems such as software agents.

It will be appreciated that variations of some elements are possible to adapt the invention for specific conditions or functions. The concepts of the present invention can be further extended to a variety of other applications that are clearly within the scope of this invention. Having thus described the present invention with respect to a preferred embodiment as implemented, it will be apparent to those skilled in the art that many modifications and enhancements are possible to the present invention without departing from the basic concepts as described herein. Therefore, what is intended to be protected by way of letters patent should be limited only by the scope of the following claims.

The embodiments of the invention in which an exclusive property or privilege is claimed are defined as follows:

1. A method for selecting and configuring suitable servers to run various software modules in a software development environment comprising:
   receiving a request to run a software module developed in the development environment;
   determining whether there is a server currently configured to run the software module;
   in response to a determination that there is no server currently configured to run the software module, determining whether a priority table includes, in a list of identified servers ordered in a preferred hierarchy in the software development environment, an identifier of a suitable server being suitable for running the software module, the preferred hierarchy including, in a topmost positioned, a user-identified server;
   in response to determining that there is no identifier of the suitable server in the priority table, identifying a type of suitable server that is configurable to run the software module from a backup table comprising pairs of data, each pair of data including an identifier of a type of software module and an corresponding identifier of a type of server capable of supporting the type of software module; and
   configuring the suitable server based on the identified type to run the software module.

2. The method of claim 1, further comprising:
   executing the configured suitable server to run the software module.

3. The method of claim 1, further comprising:
   determining that the priority table identifies
   a prioritized suitable server;
   inserting the identifier of the suitable server into a preferred table, the preferred table comprising pairs of data, each pair of data including an identifier of a software module and an corresponding identifier of a preferred suitable server; and,
   configuring the prioritized suitable server being identified from the priority table to run the software module.

4. The method of claim 1, wherein the priority table comprises prioritized identifiers of suitable servers.

5. The method of claim 1, further comprising:
   upon determining that the existence of the server currently configured to run the software module and also determining that there is the server is suitably configured to run the software module, inserting the identifier of the suitable server into a preferred table, the preferred table comprising pairs of data, each pair of data including an identifier of a software module and an corresponding identifier of a preferred suitable server.

6. A computer program product for use in a computer system operatively coupled to a computer readable memory, the computer program product including a computer-readable data storage device tangibly embodying computer readable program code for directing said computer to select and configure servers to run various software modules in a software development environment, said computer readable program code, when executed by the computer system, causes the computer system to perform the steps comprising:

receiving a request to run a software module developed in the development environment;

determining whether there is a server currently configured to run the software module;

in response to a determination that there is no server currently configured to run the software module, determining whether a priority table includes, in a list of identified servers ordered in a preferred hierarchy in the software development environment, an identifier of a suitable server being suitable for running the software module, the preferred hierarchy including, in a topmost positioned, a user-identified server, identifying a type of suitable server that is configurable to run the software module from a backup table comprising pairs of data, each pair of data including an identifier of a type of software module and an corresponding identifier of a type of server capable of supporting the type of software module; and configuring the suitable server based on the identified type to run the software module.

7. The computer program product of claim 6, further comprising:

computer readable program code for instructing said computer system to execute the configured suitable server to run the software module.

8. The computer program product of claim 6, further comprising:

computer readable program code for determining that the priority table identifies;

a prioritized suitable server;

computer readable program code for inserting the identifier of the suitable server into a preferred table, the preferred table comprising pairs of data, each pair of data including an identifier of a software module and an corresponding identifier of a preferred suitable server; and, computer readable program code for configuring the prioritized suitable server being identified from the priority table to run the software module.

9. The computer program product of claim 6, wherein the priority table comprises prioritized identifiers of suitable servers.

10. The computer program product of claim 6, further comprising:

upon determining that the existence of the server currently configured to run the software module and also determining that there is the server is suitably configured to run the software module, computer readable program code for inserting the identifier of the suitable server into a preferred table, the preferred table comprising pairs of data, each pair of data including an identifier of a software module and an corresponding identifier of a preferred suitable server.

11. A computer system operatively coupled to a computer readable memory, the computer system for selecting and configuring suitable servers to run various software modules in a software development environment, the computer system comprising:

a processor configured to perform the steps including receiving a request to run a software module developed in the development environment;

determining whether there is a server currently configured to run the software module;

in response to a determination that there is no server currently configured to run the software module, determining whether a priority table includes, in a list of identified servers ordered in a preferred hierarchy in the software development environment, an identifier of a suitable server being suitable for running the software module, the preferred hierarchy including, in a topmost positioned, a user-identified server;

in response to determining that there is no identifier of the suitable server in the priority table, identifying a type of suitable server that is configurable to run the software module from a backup table comprising pairs of data, each pair of data including an identifier of a type of software module and an corresponding identifier of a type of server capable of supporting the type of software module; and configuring the suitable server based on the identified type to run the software module.

12. The computer system of claim 11, wherein the processor of the computer system is further configured to execute the configured suitable server to run the software module.

13. The computer system of claim 11, wherein the processor of the computer system is further configured to perform the steps including:

determining that the priority table identifies a prioritized suitable server;

inserting the identifier of the suitable server into a preferred table, the preferred table comprising pairs of data, each pair of data including an identifier of a software module and an corresponding identifier of a preferred suitable server; and, configuring the prioritized suitable server being identified from the priority table to run the software module.

14. The computer system of claim 11, wherein the priority table comprises prioritized identifiers of suitable servers.

15. The computer system of claim 11, wherein the processor of the computer system is further configured to perform the steps including:

upon determining that the existence of the server currently configured to run the software module and also determining that there is the server is suitably configured to run the software module, inserting the identifier of the suitable server into a preferred table, the preferred table comprising pairs of data, each pair of data including an identifier of a software module and an corresponding identifier of a preferred suitable server.

* * * * *